United States Patent
Ishii et al.

(10) Patent No.: US 6,653,384 B1
(45) Date of Patent: Nov. 25, 2003

(54) PROCESS FOR PRIMING ALUMINUM MATERIALS AND PRIMERS

(75) Inventors: Toru Ishii, Shizuoka (JP); Kazuhiko Yamazaki, Shizuoka (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 0 days.

(21) Appl. No.: 09/512,220

(22) Filed: Feb. 24, 2000

(30) Foreign Application Priority Data

Feb. 26, 1999 (JP) ............................................ 11-051662

(51) Int. Cl.⁷ ................................................. C08K 5/03
(52) U.S. Cl. ....................... 524/417; 524/429; 524/437; 524/492; 524/493
(58) Field of Search ................................ 524/388, 417, 524/413, 429, 492, 493, 437

(56) References Cited

U.S. PATENT DOCUMENTS

| | | | | |
|---|---|---|---|---|
| 4,103,049 A | * | 7/1978 | Nishida et al. | 427/341 |
| 4,104,424 A | * | 8/1978 | Steinbrecher et al. | 427/435 |
| 4,373,050 A | * | 2/1983 | Steinbrecher et al. | 427/309 |
| 4,671,825 A | * | 6/1987 | Ishii et al. | 148/251 |
| 4,973,359 A | * | 11/1990 | Yamasoe | 106/14.13 |
| 5,164,234 A | * | 11/1992 | Siebert | 106/14.12 |
| 5,478,872 A | * | 12/1995 | Yamasoe et al. | 524/221 |
| 5,584,944 A | * | 12/1996 | Bershas et al. | 148/246 |
| 6,312,812 B1 | * | 11/2001 | Hauser et al. | 428/412 |

FOREIGN PATENT DOCUMENTS

JP 55-115975 9/1980

OTHER PUBLICATIONS

Abstract of Japanese Patent Publ. No. 62010280; Dated Jan. 19, 1987.

* cited by examiner

Primary Examiner—Judy M. Reddick
(74) Attorney, Agent, or Firm—Arent Fox Kintner Plotkin & Kahn PLLC

(57) ABSTRACT

This invention relates to a process for priming an aluminum material by applying a primer containing the nitrate or related compound of a metal selected from aluminum, zirconium, cerium, chromium, and iron to the surface of the aluminum material so that the amount of adhering metal becomes 1.0 mM/m² or more and baking the primer, and also relates to a primer for an aluminum material containing water-soluble acrylic acid-based polymers in the range of 3.5 to 22.5 g/l as solids concentration, the nitrate or related compound of a metal selected from aluminum, zirconium, cerium, and iron in the range of 30 to 500 g/l, a hydrofluoric acid-based compound in the range of 1.0 to 5.0 g/l as elemental fluorine, and an organic reducing agent in the range of 5 to 30 g/l. This invention makes it possible to apply a primer to the surface of an aluminum material with excellent corrosion resistance.

3 Claims, No Drawings

PROCESS FOR PRIMING ALUMINUM MATERIALS AND PRIMERS

FIELD OF THE INVENTION AND RELATED ART OF STATEMENT

This invention relates to priming to be performed as pretreatment before the application of coatings to the surface of articles made from aluminum or its alloys (hereinafter referred to as aluminum materials) and, more particularly, to a process for priming aluminum materials with excellent corrosion resistance and primers therefor.

Aluminum materials are generally characterized by lightweight, good processability, and excellent thermal conductivity and are consumed in a wide variety of applications, for example, in fins to be installed in the heat-exchanging unit of an air conditioner and in sashes and other construction materials. Depending upon where or for what purpose aluminum materials are used, various coatings are applied to the surface of the aluminum materials to provide such properties as hydrophilic, antibacterial, corrosion-resistant, scratch-resistant, antistatic, and lubricative or to improve the external appearance.

In application of the aforementioned coatings, priming is generally performed to protect the aluminum materials themselves against corrosion or promote the adhesion of the coating films to the surface of aluminum materials and, in particular, priming assumes importance in the cases where the application of coatings is intended for providing the aforementioned properties or improving the external appearance.

OBJECT AND SUMMARY OF THE INVENTION

The present inventors have conducted extensive studies on how to perform priming with excellent corrosion resistance, found that such priming can be performed by applying a primer containing the nitrate or related compound of a specific metal to the surface of an aluminum material so that the amount; of adhering metal becomes 1.0 mM/m$^2$ or more and then baking the primer, and completed this invention.

Accordingly, an object of this invention is to provide a process for priming the surface of an aluminum material with excellent corrosion resistance.

Another object of this invention is to provide primers suitable for priming the surface of an aluminum material with excellent corrosion resistance.

Thus, this invention relates to a process for priming an aluminum material which comprises applying a primer containing the nitrate or related compound of a metal selected from aluminum, zirconium, cerium, chromium, and iron to the surface of an aluminum material so that the amount of adhering metal becomes 1.0 mM/m$^2$ or more and then baking the primer.

Primers useful for the process of this invention for priming contain water-soluble acrylic acid-based polymers in the range of 3.5 to 22.5 g/l as solids concentration, the nitrate or related compound of a metal selected from aluminum, zirconium, cerium, chromium, and iron in the range of 30 to 500 g/l, a hydrofluoric acid-based compound in the range of 1.0 to 5.0 g/l as elemental fluorine, and an organic reducing agent in the range of 5 to 30 g/l.

Water-soluble acrylic acid-based polymers useful for the primers of this invention are water-soluble polymers to be obtained by polymerization or copolymerization of compounds such as acrylic acid, methyl acrylate, ethyl acrylate, isopropyl acrylate, n-butyl acrylate, isobutyl acrylate, methacrylic acid, methyl methacrylate, ethyl methacrylate, isopropyl methacrylate, n-butyl methacrylate, isobutyl methacrylate, maleic acid, and itaconic acid and they may be used singly or as a mixture of two kinds or more. As these water-soluble acrylic acid-based polymers need to undergo chelation with the co-existing metal ions to become insoluble in water when baked at a relatively low temperature for a short time, their average molecular weight is preferably 10,000 to 300,000. Such water-soluble acrylic acid-based polymers are available as commercial products, for example, Acumer 2100 and Acumer 1510 (tradename of Rohm and Haas).

The nitrate or related compound of a metal useful for the primers of this invention is the nitrate or related compound of a metal selected from aluminum, zirconium, cerium, chromium, and iron, either of a single metal or of a mixture of two kinds or more of metals. Concrete examples of such metal nitrates and related compounds are aluminum nitrate [Al(NO$_3$)$_3$·9H$_2$O, molecular weight 375], zirconium nitrate [Zr(NO$_3$)$_4$·5H$_2$O, molecular weight 492], zirconium oxynitrate [ZrO(NO$_3$)$_2$·2H$_2$O, molecular weight 267], cerium nitrate [Ce(NO$_3$)$_3$·6H$_2$O, molecular weight 434], chromium nitrate [Cr(NO$_3$)$_3$·9H$_2$O, molecular weight 400], and iron nitrate [Fe(NO$_3$)$_3$·9H$_2$O, molecular weight 404].

Primers of this invention contain organic reducing agents and form films in which the organic-reducing agents coexist. In consequence, where chromium nitrate is used as metal nitrate, any hexavalent chromium ions that form and try to be set free are reduced to trivalent chromium ions and no environmental problem would arise as the release of hexavalent chromium ions is completely prevented. However, on account of a favorable impression created by chromium-free corrosion-resistant priming, it is desirable to use the nitrate or related compound of a metal selected from aluminum, zirconium, cerium, and iron. In particular, the nitrate or related compound of a metal selected from aluminum and zirconium forms primer films which are corrosion-resistant to varying degrees depending upon the amount of adhering metal and, in addition, colorless and transparent and its usage in the primers intended for clear coatings is preferable from the standpoint of accentuating the metallic appearance of aluminum.

Hydrofluoric acid-based compounds to be used in the primers of this invention include, for examples hydrofluoric acid and soluble hydrofluoric acid salts such as silicon fluoride, boron fluoride, titanium fluoride, zirconium fluoride, and zinc fluoride and they may be used singly or as a mixture of two kinds or more.

As for organic reducing agents, those which are soluble in water, do not decompose or evaporate during baking, and remain in the primer films to perform a reducing action are satisfactory; concrete examples are polyhydric alcohols and saccharides such as ethylene glycol, glycerol, erythritol, arabitol, mannitol, glucose, and fructose and they may be used singly or as a mixture of two kinds or more.

From the standpoint of improving the resistance to pitting corrosion of the material to be treated. it is allowable to add, if necessary, phosphoric acid-based compounds to the primers of this invention; for example, phosphoric acids such as orthophosphoric acid, pyrophosphoric acid, metaphosphoric acid, and phosphorous acid and, to the extent of 5 g/l or less, alkali phosphates such as sodium phosphate, sodium pyrophosphate, sodium polyphosphates, and sodium hexametaphosphate. Moreover, in order to promote the adhesion of primer film to coating for quality improvement or to raise the viscosity of the priming bath for ease of application and improvement of workability, it is allowable to add silica, preferably pulverized to particles with an average diameter of 1 μm or less, particularly to primary particles 50% or more of which is 1 μm or less in diameter.

The primers of this invention normally contain the aforementioned components at the following concentrations: water-soluble acrylic acid-based polymers in the range of 3.5 to 22.5 g/l, preferably 7 to 15 g/l, as solids concentration; nitrate or related compound of metal in the range of 30 to 500 g/l, preferably 50 to 150 g/l; hydrofluoric acid-based compound in the range of 1.0 to 5.0 g/l, preferably 2.0 to 3.0 g/l, as elemental fluorine; organic reducing agent in the range of 5 to 30 g/l, preferably 8 to 15 g/l; phosphoric acid-based compound to be added as needed in the range of 2.5 to 14.5 g/l, preferably 4 to 8 g/l, as $PO_4$; and silica 0.1 or less, preferably 0.05 or less, in terms of the solid ratio [silica/(total solids)].

There is the possibility that water-soluble acrylic acid-based polymers with a solids concentration of less than 3.5 g/l do not give sufficient film-forming performance while those with a solids concentration of more than 22.5 g/l adversely affect the stability of the primers.

Where the nitrate or related compound of a metal is present at a concentration below 30 g/l, more of the primer needs to be applied in order to obtain the amount of adhering metal of 1.0 mM/m$^2$ or more which is required to secure the proper performance of the primer and this increased amount of the primer makes it difficult to obtain uniform film thickness on a commercial scale due to sagging during application or non-uniform drying in the treating bath.: Conversely, a concentration of higher than 500 g/l not only harms the stability of the bath but also brings about operational instability by narrowing the latitude in controlling the amount of the primer to be applied in order to secure the specified amount of adhering metal.

The organic reducing agent at a concentration of less than 5 g/l lacks the reducing capacity when applied to a chromium-based primer and allows partial formation of hexavalent chromium; when applied to other primers, the neutralization reaction by esterification of excess carboxyl groups of polyacrylic acid proceeds insufficiently with the resultant decline in corrosion resistance. Conversely, at a concentration higher than 30 g/l, the excess of the organic reducing agent remaining unreacted hinders the normal curing reaction of the coating to be applied on the primer.

The phosphoric acid-based compounds, added as needed, do not produce the anticipated effect of improving the resistance to pitting corrosion when added at a concentration lower than 2.5 g/l. On the other hand, when added at a concentration higher than 14.5 g/l, they remain partly unreacted in the primer films and impair the corrosion resistance of the primer films. In the case of silica which is added as needed, the hydrophilicity of the primer films themselves improves when the solid ratio [silica/(total solids)] exceeds 0.1, but silica particles join together to render the bath unstable as time passes.

The primers of this invention are prepared, for example, as follows: ① aqueous solution A is prepared by dispersing silica to be added as needed uniformly in the water-soluble acrylic acid-based polymers, aqueous solution B is separately prepared by dissolving the nitrate or related compound of a metal and a phosphoric acid-based compound to be added as needed in water, and mixing the two aqueous solutions A and B immediately before use: ② a single solution is prepared by dissolving all the components in water; ③ the components other than the metal nitrate are dissolved in water beforehand and the metal nitrate is added and dissolved immediately before use: and ④ all the components are dissolved in water immediately before use.

The process for priming with the use of the primers of this invention can be executed by suitably adopting any of the procedures hitherto known: for example, roll coating or spray coating is applied to aluminum materials of relatively simple shape such as plate and profile while brushing, dip coating, or spray coating is applied to aluminum materials of relatively complex shape.

In this invention, it is necessary to apply a primer containing the nitrate or related compound of a metal so that the amount of adhering metal becomes 1.0 mM/m$^2$ or more, preferably 1.0 to 5.0 mM/m$^2$, more preferably 1.0 to 3.0 mM/m$^2$ and bake the primer. The amount of adhering metal here is expressed in millimole/m$^2$ (mM/m$^2$) computed by dividing the weight of the metal adhering on a unit area on the surface of the aluminum material by the atomic weight of the metal. Sufficient corrosion resistance is occasionally not obtained when the amount of adhering metal is lower than 1.0 mM/m$^2$ and, though there is no restriction to the upper limit of this amount from the standpoint of corrosion resistance, application in excess of 5.0 mM/m$^2$ is not desirable as a decline in adhesion of coating films results. The amount of adhering metal can be controlled readily by controlling the concentration of metal nitrates or related compounds in the primers or controlling the number of applications of primers or a combination of these means.

In the cases where the nitrate or related compound of a metal is that of aluminum or zirconium, in particular, aluminum nitrate, the amount of adhering metal is preferably in the range of 1.5 to 3.0 mM/m$^2$, more preferably 2.0 to 3.0 mM/m$^2$, and adhesion of this much metal exhibits excellent corrosion resistance and, when used in primers for hydrophilic coatings, produces an effect for markedly improving the hydrophilicity of the films of certain types of such hydrophilic coatings.

Baking which follows application of the primers in this invention can be performed in the usual manner; for example, by heating at 100 to 300° C., preferably at 150 to 280° C., for 10 seconds to 30 minutes. When heated at a temperature below 100° C., baking and reductive insolubilization take place insufficiently and poor adhesion of the primer film results. On the other hand, when heated at a temperature above 300° C., there is the possibility of the water-soluble acrylic acid-based polymers decomposing and deteriorating depending upon the length of heating.

The primer film formed on the surface of the aluminum material in accordance with the process of this invention is considered to be composed of three layers as a whole, an extremely thin layer (the first layer) of aluminum fluoride, aluminum silicofluoride, and the like formed in the boundary between the aluminum material and the film, a relatively thick inorganic layer (the second layer) mainly composed of metal compounds formed on the first layer, and an uppermost layer (the third layer) of resins containing silica which is added as needed formed on the second layer. Because of this three-layer structure, the primer films of this invention are not merely highly corrosion-resistant but adhere strongly to the surface of aluminum materials, and they act to promote markedly the adhesion to a variety of coatings, particularly to organic coatings, which are applied for the purpose of providing various properties such as hydrophilicity, resistance to bacteria, corrosion resistance, scratch resistance, and lubricity or improving the external appearance.

According to this invention, it is possible to perform priming with excellent corrosion resistance before the application of coatings to the surface of aluminum materials.

DETAILED OF THE PREFERRED EMBODIMENTS

A preferred mode of execution of this invention will be described concretely below with reference to the accompanying examples and comparative examples.

EXAMPLES 1 TO 9 AND COMPARATIVE EXAMPLES 1 TO 4

Preparation of Primers

Aqueous solution A was prepared from polyacrylic acid containing 25% by weight of solids (Acumer 1510, tradename of Rohm and Haas, average molecular weight 60,000) as water-soluble acrylic acid-based polymer, powdered silica in primary particles with an average particle diameter of 0.01 $\mu$m (Cab-O-Sil M-5, tradename of Cabot Corp.) as silica, and glycerol as an organic reducing agent. Also, aqueous solution B was prepared from each of aluminum nitrate [AlNA: $Al(NO_3)_3 \cdot 9H_2O$, molecular weight 375], zirconium oxynitrate [ZrNA: $ZrO(NO_3)_2 \cdot 2H_2O$, molecular weight 267], cerium nitrate [CeNA: $Ce(NO_3)_3 \cdot 6H_2O$, molecular weight 434], chromium nitrate [CrNA: $Cr(NO_3)_3 \cdot 9H_2O$, molecular weight 400], and iron nitrate [FeNA: $Fe(NO_3)_3 \cdot 9H_2O$, molecular weight 404] shown in Table 1 as nitrate or related compound of metal, hydrofluoric acid (about 46%) as hydrofluoric acid-based compound, and orthophosphoric acid (100% $H_3PO_4$) as phosphoric acid-based compound.

In Examples 1 to 9 and Comparative Examples 1 to 4, the aqueous solutions A and B are mixed so that each component exists at the following concentration: polyacrylic acid, 7.5 g/l as solids concentration; hydrofluoric acid-based compound, 2.5 g/l as elemental fluorine; glycerol, 10 g/l; orthophosphoric acid, 4.7 g/l as $PO_4$; silica 0.03 in terms of the solid ratio [silica/(total solids)]; and the nitrate or related compound of the metal as hydrate at the concentration (g/l) shown in Table 1.

Preparation of Test Pieces

The aluminum material (AA3102, 0.15 mm×100 mm×100 mm) was degreased and cleaned in the usual manner, the aforementioned aqueous solutions A and B were mixed to prepare the primers for Examples 1 to 9 and Comparative Examples 1 to 4, and each primer was applied immediately after its preparation to the surface of the degreased aluminum material with a gravure roll. The coating weight in the treating bath can be controlled by selecting a gravure roll with suitably incised grooves and the actual coating weight can be determined by determining the moisture content in the liquid film before drying with the use of an infrared moisture meter.

Each test piece was prepared by baking the primer-coated aluminum material in a hot-air oven at 250° C. for 15 seconds to form the primer film specified for each of Examples 1 to 9 and Comparative Examples 1 to 4.

The test pieces were examined for their corrosion resistance by submitting them to wetting test and salt spray test.

The wetting test was carried out as follows in accordance with the rotary wetting test described in JIS K-5400-1990: the test piece was exposed to an atmosphere kept at 40 or 50° C. and 100% relative humidity for a period of 21 days and then dried and the area discolored by hydration on the surface was measured by a planimeter and designated as percent corrosion area (%).

The salt spray test was carried out for a period of 21 days in accordance with JIS H8681-1988.

The results are shown in Table 1.

TABLE 1

| | Nitrate or related compound of metal solids concentration (g/l) | | | | | Amt. of adhering metal | Wetting test percent corrosion area | | Salt spray test |
| --- | --- | --- | --- | --- | --- | --- | --- | --- | --- |
| | AlNA | ZrNA | CeNA | CrNA | FeNA | (mM/m$^2$) | 40° C. | 50° C. | R.N |
| Example 1 | 60 | | | | | 1.04 | 0% | 0% | 9.8 |
| Example 2 | 120 | | | | | 2.08 | 0% | 0% | >9.8 |
| Example 3 | 150 | | | | | 2.60 | 0% | 0% | 9.8 |
| Example 4 | | 43 | | | | 1.06 | 0% | 10% | >9.8 |
| Example 5 | | 87 | | | | 2.11 | 0% | 0% | >9.8 |
| Example 6 | | | 73 | | | 1.09 | 0% | 0% | >9.8 |
| Example 7 | | | | 67 | | 1.09 | 0% | 0% | >9.8 |
| Example 8 | | | | | 63 | 1.01 | 0% | 0% | 9.5 |
| Example 9 | | | | | 79 | 1.27 | 0% | 0% | 9.5 |
| Comp. example 1 | 30 | | | | | 0.52 | 10% | 40% | 9.5 |
| Comp. example 2 | | 35 | | | | 0.85 | 0% | 100% | 9.8 |
| Comp. example 3 | | | 27 | | | 0.40 | 100% | 100% | NG |
| Comp. example 4 | | | | 34 | | 0.51 | 15% | 100% | 9.8 |

As is apparent from the results indicated in Table 1, the examples in which the amount of adhering metal is 1.0 mM/m$^2$ or more provide better corrosion resistance than the examples in which the amount of adhering metal is less than 1.0 mM/m$^2$.

What is claimed is:

1. A primer for an aluminum material comprising at least one water-soluble acrylic acid-based polymer in the range of 3.5 to 22.5 g/l of primer as solids concentration, a metal nitrate compound wherein the metal is aluminum in the range of 30 to 500 g/l of primer, a hydrofluoric acid-based compound in the range of 1.0 to 5.0 g/l of primer as elemental fluorine, and an organic reducing agent in the range of 5 to 30 g/l of primer.

2. A primer for an aluminum material according to claim 1, wherein said primer comprises a phosphoric acid-based compound in the range of 2.5 to 14.5 g/l of primer as $PO_4$.

3. A primer for an aluminum material according to claim 1, wherein said primer comprises a ratio of silica to total solids in the range up to 0.1.

* * * * *